United States Patent [19]

Van Deventer

[11] Patent Number: 5,276,749
[45] Date of Patent: Jan. 4, 1994

[54] OPTICAL REFLECTIVE STAR DEVICE HAVING ONE OR MORE ORTHOGONAL POLARIZATION REFLECTORS

[75] Inventor: Mattijs O. Van Deventer, Leidschendam, Netherlands

[73] Assignee: Koninklijke PTT Nederland N.V., AC Groningen, Netherlands

[21] Appl. No.: 889,154

[22] Filed: May 27, 1992

[30] Foreign Application Priority Data

Jun. 3, 1991 [NL] Netherlands .......................... 9100952

[51] Int. Cl.$^5$ .............................................. G02B 6/26
[52] U.S. Cl. ........................................ 385/46; 385/47
[58] Field of Search ...................... 385/46, 39, 41, 42, 385/47

[56] References Cited

U.S. PATENT DOCUMENTS

| | | | |
|---|---|---|---|
| 4,787,693 | 11/1988 | Kogelnik et al. | 385/46 |
| 4,844,593 | 7/1989 | Parker et al. | 350/400 |
| 4,943,136 | 7/1990 | Popoff | 385/46 |

FOREIGN PATENT DOCUMENTS

| | | |
|---|---|---|
| 0315351A2 | 5/1989 | European Pat. Off. . |
| 0351132A2 | 1/1990 | European Pat. Off. . |
| 2214746A | 9/1989 | United Kingdom . |
| 2228799A | 9/1990 | United Kingdom . |

OTHER PUBLICATIONS

Optics Communications, vol. 72, No. 6, Aug. 1989, pp. 341–344, M. Martinelli, "A Universal Compensator for Polarization Changes Induced Y Birefringence on a Retracing Beam".

Optics Letters, vol. 16, No. 10, May 15, 1991, pp. 711–713, N. C. Pistoni et al., "Polarization Noise Suppression in Retracing Optical Fiber Circuits".

A. A. M. Saleh, Fellow, IEEE, and H. Kogelnik, Fellow, IEEE, "Reflective Single-Mode Fiber-Optic Passive Star Couplers"; pp. 392–398; Journal of Lightwave Technology, vol. 6, No. 3, Mar. 1988.

Primary Examiner—John D. Lee
Assistant Examiner—Phan T. Heartney
Attorney, Agent, or Firm—Frishauf, Holtz, Goodman & Woodward

[57] ABSTRACT

An optical reflective star device having a number of ports for distributing each signal fed to a port over the other ports. Said optical reflective star device is made up a number of star elements and comprises a number of reflectors provided at reflection points in the reflective star device. At least one of the reflectors is an orthogonal polarisation reflector.

14 Claims, 1 Drawing Sheet

Fig-1 PRIOR ART
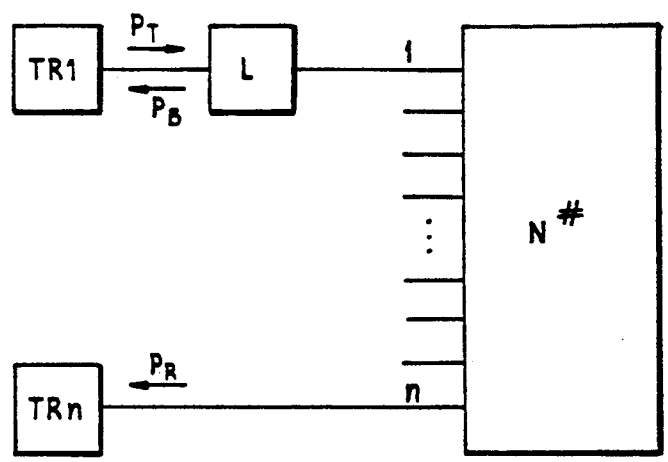
Fig-2
Fig-3
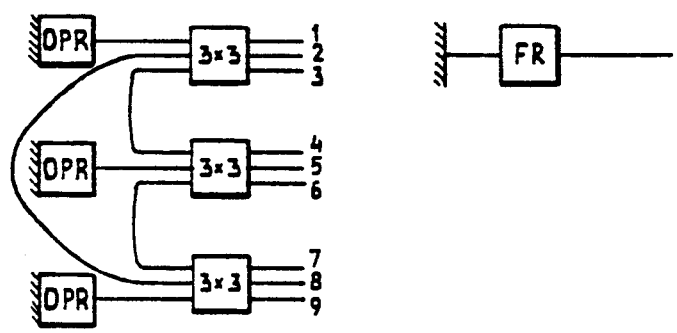
Fig-4
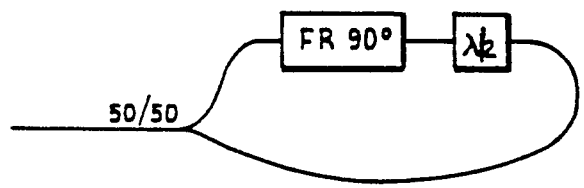
Fig-5
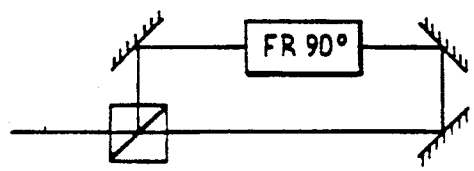

OPTICAL REFLECTIVE STAR DEVICE HAVING ONE OR MORE ORTHOGONAL POLARIZATION REFLECTORS

The invention relates to an optical reflective star device having a number of ports for distributing each signal fed to a port over the other ports, comprising a number of star elements and a number of reflectors provided at reflection points in the reflective star device. Such a device is disclosed by the paper entitled "Reflective Single-Mode Fibre-Optic Passive Star Couplers" published in Journal of Lightwave Technology, vol. 6, no. 3, March 1988, pages 392-398.

BACKGROUND AND RELATED ART

The paper mentioned above describes the construction of various star configurations and also the advantages of lower losses of the star configuration compared with the bus configuration. A star configuration is therefore being used to an ever increasing extent in LAN networks.

In the paper mentioned, reflective star devices are given preference over transmission star devices since, in the first-named devices, the number of glass fibres, and therefore the components associated therewith, is reduced by a factor of two compared with the transmission star device. Instead of separate inputs and outputs for a transmitting and a receiving device, the reflective star device has ports which each serve both to input and output the signals to the reflective star device from a transmitting and receiving device. The various connections could in that case be provided with diplexers for separating the transmitted and received signals.

The known reflective star device is made up of a number of star elements, for example 3 dB coupling devices, transmission star elements or reflective star elements which distribute a signal fed to a port of such a star element over the other ports thereof. Reflectors are connected to a number of ports of the elements to create reflection points.

If a signal is fed to one of the ports of the reflective star device, said signal is distributed over the other ports thereof, but a reflection signal is also presented via the feed port to the transmitting and receiving device connected thereto. It is generally known that certain lasers are extremely sensitive to externally injected light, in particular if said light has a frequency near the characteristic optical oscillation frequency. In addition, such lasers are especially sensitive to reflections in their own polarisation direction and less sensitive to reflections having a perpendicular polarisation. In a conventional reflective star device, the signal also reflected to its own port may have any random polarisation.

One of the standard solutions used is to couple lasers badly into the glass fibre, with the disadvantage of a large power loss. Another standard solution is to use optical isolators for all the lasers, with the result that a large number of additional components are necessary, and in particular one optical isolator for each port.

SUMMARY OF THE INVENTION

The object of the invention is to provide a reflective star device of the type mentioned in the introduction in which the above-mentioned problems are avoided.

According to the invention this object is achieved in that at least one of the reflectors is an orthogonal polarisation reflector.

The invention is based on the insight that an optical polarisation reflector always reflects the orthogonal polarisation and this orthogonality is retained in any reciprocal system. The result is that the reflection having a perpendicular polarisation enters the laser. The optical isolation requirements on the laser side can therefore be eased. As a result, it is generally possible to waive the use of the large number of isolators, it only being necessary to replace the much smaller number of normal reflectors by a number of orthogonal polarisation reflectors.

In one embodiment of the invention, the orthogonal polarisation reflector is formed by a 45° Faraday rotator and a following mirror or reflective facet.

In another embodiment, the orthogonal polarisation reflector contains a signal transmission loop, as a result of which the signal fed to the polarisation reflector is again fed back in the reverse direction. Said signal transmission loop incorporates a non-reciprocal element.

In a further elaboration of the invention, said non-reciprocal element is formed by a 90° Faraday rotator. In addition, the signal transmission loop may contain a half-λ retarder.

In another, further elaboration of the invention, the signal transmission loop contains, in addition to the 90° Faraday rotator, also an odd number of mirrors or reflective facets.

The invention furthermore relates to an optical transmission network provided with one or more reflective star devices according to one of the embodiments mentioned above.

Under extreme conditions, a polarisation filter which filters out the residual signal having undesirable polarisation may be provided in such a network in the transmitting section of one or more of the transmitting and receiving devices connected to the network.

BRIEF DESCRIPTION OF THE DRAWINGS

The invention will be explained in greater detail below by reference to the drawings. In the drawings:

FIG. 1 shows a block diagram of a conventional network made up of one or more reflective star devices;

FIG. 2 shows an embodiment of the reflective star device according to the invention;

FIGS. 3, 4 and 5 show embodiments of orthogonal polarisation reflectors according to the invention.

DESCRIPTION OF THE ILLUSTRATED EMBODIMENTS

FIG. 1 shows conventional reflective star device N having the ports 1-n associated therewith. Connected to the port 1 is a transmitting and receiving device TR1 having the transmitter coupling-in loss L associated therewith. The transmitter emits an optical signal having a power $P_T$, which signal is distributed over the other ports by the reflective star device N, with the result that a power $P_R$ is received in the transceiver TRn. This network has the property that a reflection signal having the power $P_B$ is also emitted in the direction of the transceiver TR1.

The following equations apply to the network or topology described:

$$P_B \text{max} = P_T \cdot L^2 \cdot n \qquad (1)$$

$$P_R \text{min} = P_T \cdot L \cdot n \qquad (2)$$

In the equations mentioned, $P_T$ is the transmitting power, $P_B$max is the maximum permitted power reflected to the transmitter and $P_R$min is the minimum permitted received power. The following relationships can be derived from Equations 1 and 2:

$$L = P_R\text{min}/P_B\text{max} \tag{3}$$

$$n = P_B\text{max} \cdot P_T / P^2_R\text{min} \tag{4}$$

Typical values may be:
$P_T = 10$ mW (10 dBm)
$P_R$ min $= 1$ μW ($-30$ dBm)
$P_B$ max $= 10$ nW ($-50$ dBm)
For this example with the requirements imposed in this case, it follows for the optimum network that
$L = 100$ (20 dB coupling-in loss) and
$n = 100$ connections or ports.

The reflection sensitivity is often assumed to be one number. However, for so-called DFB lasers, for example, it is known that they are much more sensitive to injection of light at or around the characteristic optical frequency than at other frequencies. A DFB laser is also much more sensitive to reflections in its own polarisation direction than in other polarisation directions and is the least sensitive in a polarisation direction perpendicular to its own polarisation direction. This is certainly the case if the DFB laser is followed by a polarising device.

For a conventional reflective star device, it is the case that the reflection has a random polarisation direction. This is due to the fact that, in the glass fibre to the star, the polarisation can alter randomly and that, at the point of reflection, the polarisation of the returning or reflected signal is the same as the outgoing signal (the linear polarisation), or alternatively precisely orthogonal (in the case of circular polarisation), or alternatively something inbetween (in the case of elliptical polarisation), to put it briefly, random.

A trend is observable in the manufacture of semiconductor lasers in which high-power lasers are coupled in badly in order to reduce the reflection sensitivity in this way. It will be possible to use such bad coupling-in in a reflective star device, but at the expense of large power loss.

The paper entitled "Reflective Single-Mode Fibre-Optic Passive Star Couplers" gives a number of examples of the construction of reflective star devices. This paper describes how the reflective star device has a number of reflection points at which reflectors are provided.

FIG. 2 describes a reflective star device according to the invention of limited size.

This reflective star device consists of three by three transmission star devices, which reflective star device has nine input/output ports 1-9 formed by the right-hand ports of the three by three star devices. Connected to one of the left-hand ports of the three by three star devices is one orthogonal polarisation reflector OPR in each case. The remaining left-hand ports of said three by three reflection devices are connected to the left-hand ports of the other three by three reflection devices. The configuration shown in FIG. 2 therefore fulfills the proposal according to the invention that orthogonal polarisation reflectors are provided instead of the known standard reflectors. As a result, the polarisation of the returning reflected signal at a port will be orthogonal to the polarisation of the outgoing signal. This orthogonality is retained over all the glass fibres and coupling-in devices, provided, of course, that these do not have a polarisation-dependent loss. In this way, a reflection signal will be fed to the laser of the sending transceiver device which has a polarisation in a direction which is the least sensitive for the laser.

FIG. 3 shows the basic diagram of an orthogonal polarisation reflector consisting of a 45° Faraday rotator and a mirror. Vertically polarised light returns horizontally polarised, counterclockwise polarised light returns clockwise polarised, etc. The mirror may simply be formed by a reflective facet.

FIG. 4 shows an orthogonal polarisation reflector according to the invention consisting of a signal transmission loop which incorporates a non-reciprocal element which, according to the embodiment shown, takes the form of a 90° Faraday rotator connected to said 90° Faraday rotator is a half-λ retarder.

FIG. 5 shows another embodiment of an orthogonal polarisation reflector in which a mirror, a 90° Faraday rotator FR 90° and two mirrors are consecutively incorporated in the signal transmission loop. The mirrors may be replaced by reflective facets.

If the decrease in the reflection sensitivity in the reflective star device according to the invention is represented by "X", equations (1) to (4) inclusive become:

$$P_{Laser} = P_T \cdot X \cdot L^2 \cdot n \tag{5}$$

$$P_R = P_T \cdot L \cdot n \tag{6}$$

$$L = P_R/(P_B \cdot X) \tag{7}$$

$$n = X \cdot P_B \cdot P_T / P^2_R \tag{8}$$

The factor X can easily become 10-100 (10-20 dB), depending on the quality of the Faraday rotator, the network and the optional use of a polarisation device.

If the factor X is assumed to equal 10 (10 dB), it follows that:
$L = 10$ (10 dB coupling-in loss) and
$n = 1000$ connections.

In the known solution of optical isolators at the transmitting side, n isolators are needed in a reflective star device having n ports. The invention offers the advantage that, instead of the isolators, only $\sqrt{n}$ Faraday rotators need to be provided at the reflection points of the reflective star device, which results in an appreciable saving in equipment and cost.

One or more reflective star devices according to the invention can be incorporated in an optical transmission network, a number of ports being obtained for the connection of transceiver devices.

If desired, a polarisation filter can be provided in the transmitting section of one or more transceiver devices.

I claim:

1. An optical reflective star device, having a plurality of ports, for distributing each signal fed to a port over to the other ports, comprising a plurality of star elements and a plurality of reflectors provided at reflection points in the reflective star device, characterized in that at least one of the reflectors is incorporated together with means, including a Faraday rotator, for reducing effects of reflection to said port to which said signal is fed for distribution to said other ports.

2. The device according to claim 1, characterized in that a plurality of the said reflectors provided at reflection points in a reflective star device are each incorporated together with means, including a Faraday rotator, for reducing effects of reflection to said port to which said signal is fed for distribution to said other ports.

3. The device according to claim 2, characterized in that a plurality of the reflectors comprise a signal transmission loop which incorporates said Faraday rotator of said means for reducing effects of reflection to said port to which said signal is fed for distribution to said other ports.

4. The device according to claim 3, characterized in that each said Faraday rotator is a 90° Faraday rotator.

5. The device according to claim 4, characterized in that each said signal transmission loop includes, in said means for reducing effects of reflection to said port to which said signal is fed for distribution to said other ports, a half-λ retarder.

6. The device according to claim 4, characterized in that each said signal transmission loop includes, in said means for reducing effects of reflection to said port to which said signal is fed for distribution to said other ports, an odd number of mirrors or reflective facets.

7. The device according to claim 2, characterized in that each said Faraday rotator is a 45° Faraday rotator and each of said plurality of reflectors includes a mirror or reflector facet following said 45° Faraday rotator and reflecting back thereto.

8. The device according to claim 1, characterized in that said at least one of the reflectors comprises a signal transmission loop which incorporates therein said Faraday rotator of said means for reducing effects of reflection to said port to which said signal is fed for distribution to said other ports.

9. The device according to claim 8, characterized in that said Faraday rotator of said means for reducing effects of reflection to said port to which said signal is fed for distribution to said other ports is a 90° Faraday rotator.

10. The device according to claim 9, characterized in that said means for reducing effects of reflection to said port to which said signal is fed for distribution to said other ports includes a half-λ retarder incorporated in said signal transmission loop.

11. The device according to claim 9, characterized in that said means for reducing effects of reflection to said port to which said signal is fed for distribution to said other ports includes an odd number of mirrors or reflective facets incorporated in said transmission loop.

12. The device according to claim 1, characterized in that said Faraday rotator is a 45° Faraday rotator and said reflector includes a mirror or reflector facet following said 45° Faraday rotator and reflecting back thereto.

13. An optical transmission network provided with a plurality of network ports, for the connection to each of them of a transmitting and receiving device, and with one or more reflective star devices, each having a plurality of ports to which each signal fed to one of said reflective star device ports is distributed to each other port of the same reflective star device, each said reflective star device comprising a plurality of star elements and a plurality of reflectors provided at reflection points in the reflective star device, characterized in that a plurality of said reflectors are each incorporated together with means, including a Faraday rotator, for reducing effects of reflection to said port to which said signal is fed for distribution to said other ports.

14. A transmission network according to claim 13, characterized in that a polarization filter is provided in the transmitting section of at least one of said transmitting and receiving devices.

* * * * *